3,075,013
UNSYMMETRICALLY SUBSTITUTED OXAMIDINES AND METHOD OF PREPARATION
Robert George Haldeman, Norwalk, and Lucille Theresa Morin and Ken Matsuda, Stamford, Conn., assignors to American Cyanamid Company, New York, N.Y., a corporation of Maine
No Drawing. Filed May 18, 1960, Ser. No. 29,796
8 Claims. (Cl. 260—564)

This invention relates to new and useful compounds. More particularly, it relates to novel oxalimidic acid dihydrazides and to novel methods for preparing the same. Still more particularly, the invention is concerned with novel unsymmetrically substituted oxalimidic acid dihydrazides.

In the past, all known attempts to synthesize unsymmetrically substituted oxalimidic acid dihydrazide have met with substantial failure. Though the preparation of symmetrically substituted oxamidines as, for example, from the reaction involving cyanogen and a primary amine is known, nonetheless attempts to manufacture unsymmetrically substituted oxamidines have not been successful. Since the latter compounds heretofore unobtainable possess herbicidal activity, a method of preparation, if one such could be devised, would be highly desirable.

It is, therefore, a principal object of the present invention to provide a novel class of unsymmetrically substituted oxalimidic acid dihydrazides. It is a further object to provide a novel synthesis for the preparation of unsymmetrically substituted oxalimidic acid dihydrazides. Other objects and advantages will become apparent from a consideration of the description as set forth in detail below.

To these ends, it is surprising to find that 1-cyanoformimidic acid 2,2-dimethylhydrazide when reacted with hydrazine, or a derivative thereof, results in the formation of an unsymmetrically substituted oxalimidic acid dihydrazide. Reactions involving a primary amine or a hydrazine and 1-cyanoformimidic acid hydrazide, other than the 2,2-dimethylhydrazide derivative thereof, do not result in the preparation of unsymmetrical oxalimidic acid dihydrazides. Rather, a mixture of symmetrical dihydrazides is obtained. Thus, where the intermediate, 1-cyanoformimidic acid 2,2-dimethylhydrazide, is not employed, but another hydrazide such as, for instance, 1-cyanoformimidic acid isopropylidenehydrazide represented by the formula:

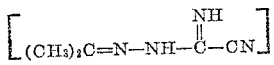

as prepared in copending application, Serial No. 27,264, filed on May 6, 1960, now U.S. Patent No. 3,033,893, is so-reacted with hydrazine, a mixture of symmetrical products is formed. This mixture comprises oxalimidic acid dihydrazide and oxalimidic acid 2,2'-diisopropylidenedihydrazide. However, the expected reaction product, unsymmetrical oxalimidic acid - 2 - isopropylidenedihydrazide, could not be detected.

According to the process of the invention, unsymmetrically substituted oxalimidic acid 2,2-dimethyl dihydrazides are unexpectedly prepared when 1-cyanoformimidic acid 2,2-dimethylhydrazide is reacted with a hydrazine in accordance with the following equation:

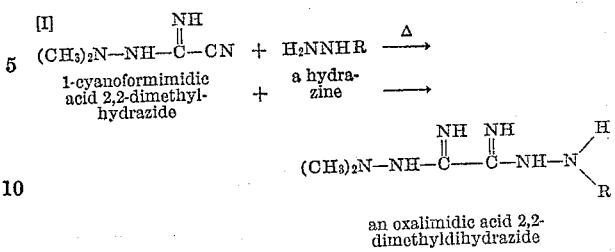

wherein R is a hydrogen atom, lower alkyl (1–4 carbons) or an aryl radical. In general, equimolar quantities of hydrazine or a substituted hydrazine and 1-cyanoformimidic acid 2,2-dimethylhydrazide are reacted in an acidified alcoholic solvent. The reactants are then heated at a temperature of from about 30° C. to 150° C. for from 0.5 to about 3 hours. The reaction mixture is thereafter cooled to about 20° C. or lower. Desired product is recovered by techniques known to the art, as by filtration and recrystallization.

The hydrazine reactant may be hydrazine per se or mono-substituted derivatives thereof such as: alkyl hydrazine illustrated by methyl hydrazine, ethyl hydrazine, n-propyl hydrazine, t-butyl hydrazine, and aryl hydrazine as, for instance, phenyl hydrazine and naphthyl hydrazine.

The 1-cyanoformimidic acid 2,2-dimethylhydrazide reactant is prepared by contacting equimolar quantities of cyanogen with 1,1-dimethyl hydrazine in an inert organic solvent for a time sufficient to effect reaction, and thereafter recovering the desired 1-cyanoformimidic acid 2,2-dimethylhydrazide. A detailed method of preparation is presented below.

It is an advantage of the present invention that an acidic alcoholic solvent can be employed during reaction. Thus, for instance, an alcoholic solvent such as ethanol, isopropanol, butanol, methyl isobutyl alcohol or methyl amyl alcohol can be employed as a convenient inert reaction medium. It is preferable to acidify the alcoholic solvent by the addition thereto of small amounts, usually in the range of 0.1% to 1%, of either a mineral or organic acid such as concentrated hydrochloric or glacial acetic acid. It is noted that the presence of such small amounts of acid assures both high yields of desired product and an acceleration of the rate of reaction.

It is a further advantage of the invention that the unsymmetrical oxalimidic acid 2,2-dimethyldihydrazide as represented by the Equation I above may be further reacted with aldehydes or ketones such as acetaldehyde, benzaldehyde, acetone, acetophenone, and their homologs in accordance with the equation:

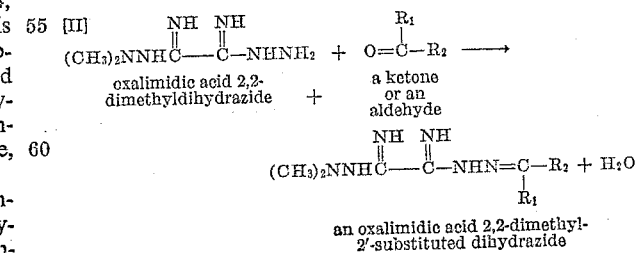

wherein $R_1$ is either a hydrogen atom or lower alkyl (of from 1–4 carbon atoms) and $R_2$ is either a lower alkyl (1–4 carbons) or phenyl radical. Thus, the benzaldehyde or acetone derivative of oxalimidic acid 2,2-dimethyldihydrazide, useful as herbicides, can be readily prepared.

The following examples are given merely as illustrative of the several embodiments of the invention. They are not to be taken as being limitative of such illustrated embodiments. Unless otherwise stated, parts are by weight.

EXAMPLE A

*Preparation of 1-Cyanoformimidic Acid 2,2-Dimethylhydrazide*

To a suitable reaction vessel containing 60 parts of 1,1-dimethylhydrazine (1 mol) in 500 parts of hexane is slowly added 52 parts of cyanogen (1 mol) with stirring. After one hour, a dark red oil separates. Cooling the mixture to about 5° C. results in solidification of the red oil. On filtration, 99 parts of an oily red solid are obtained. This corresponds to a yield of 88%. Recrystallization from hexane yields 1-cyanoformimidic acid 2,2-dimethylhydrazide, a white solid, melting at 74°–76° C.

*Analysis.*—($C_4H_8N_4$)—Calculated: C, 42.84; H, 7.19; N, 49.97; M.W. 112.1. Found: C, 42.69; H, 7.13; N, 50.20; M.W. 113.9.

EXAMPLE 1

*Preparation of Oxalimidic Acid 2,2-Dimethyldihydrazide*

To a solution of 6.6 parts of 1-cyanoformimidic acid 2,2-dimethylhydrazide (0.06 mol) prepared in Example A above in 50 parts of isopropyl alcohol is added 2.0 parts of hydrazine (0.06 mol) and 0.1% of glacial acetic acid. The solution is heated for one hour on the steam bath and is then cooled to room temperature. On filtration 75% yields of white shiny plates are obtained. These plates decompose at 154°–7° C. with evolution of gas to a yellow solid. Recrystallization of the original white plates from ethanol did not alter its decomposition point.

*Analysis.*—($C_4H_{12}N_6$)—Calculated: C, 33.32; H, 8.39; N, 58.29; M.W. 144.2. Found: C, 33.57; H, 8.48; N, 57.22; M.W. 153.1.

EXAMPLE 2

*Preparation of Oxalimidic Acid 2,2-Dimethyl-2'-Phenyl Dihydrazide*

A solution of 4.8 parts of phenylhydrazine (0.04 mol) and 5.0 parts of 1-cyanoformimidic acid 2,2-dimethylhydrazide (0.04 mol) in 100 parts of benzene, to which 0.1% of acetic acid had been added, is heated on the steam bath for one hour. The solvent is removed under vacuum leaving 9.0 parts of an orange oily solid. It represents a yield of 90%. Recrystallization from hexane gave a white solid, M.P. 127°–8° C.

*Analysis.*—($C_{10}H_{16}N_6$)—Calculated: C, 54.52; H, 7.32; N, 38.15; M.W. 220.3. Found: C, 54.87; H, 7.12; N, 38.08; M.W. 228.1.

EXAMPLE 3

Repeating Example 2 in every material respect except that 1.64 parts of methylhydrazine (0.04 mol) are added in lieu of phenylhydrazine. Resultant oxalimidic acid 2,2-dimethyl-2'-methyldihydrazide analyzes as follows:
Calculated for $C_5H_{14}N_6$: C, 37.95; H, 8.92; N, 53.12; M.W. 158.2. Found: C, 37.79; H, 8.87; N, 53.45; M.W. 156.1.

EXAMPLE 4

*Preparation of Oxalimidic Acid 2,2-Dimethyl-2'-Benzylidenedihydrazide*

A mixture of 1 mol benzaldehyde and 1 mol of oxalimidic acid 2,2-dimethyldihydrazide as prepared in Example 1 above is dissolved in alcohol and heated on the steam bath for 30 minutes. When the reaction mixture is cooled to room temperature, oxalimidic acid 2,2-dimethyl-2'-benzylidenedihydrazide, a pale yellow solid melting at 150° C.–152° C., is obtained, analyzing as follows:
Calculated for $C_{11}H_{16}N_6$: C, 56.87; H, 6.94; N, 36.18. Found: C, 57.17; H, 7.16; N, 36.50.

EXAMPLE 5

*Preparation of Oxalimidic Acid 2,2-Dimethyl-2'-Isopropylidenedihydrazide*

A mixture of oxalimidic acid 2,2-dimethyl-dihydrazide (1 mol) and acetone (5 mols) is dissolved in the presence of 0.1% glacial acetic acid. The solution is heated on a steam bath and a white shiny solid is recovered after separation of the solid from the excess acetone is effected. Oxalimidic acid 2,2-dimethyl-2'-isopropylidenedihydrazide which may be represented as:

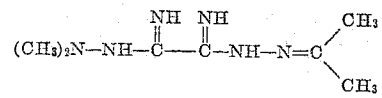

is obtained in good yield and analyzes as follows:
Calculated for $C_7H_{16}N_6$: C, 45.63; H, 8.75; N, 45.62; M.W. 184. Found: C, 45.55; H, 8.85; N, 45.53; M.W. 189.

To demonstate the utility of the unsymmetrical dihydrazides prepared above, the oxalimidic acid 2,2-dimethyl-dihydrazide will be taken as illustrative of good herbicidal activity. In the following example, the mortality (in percent) of both radish and wheat seeds is set forth.

EXAMPLE 6

Approximately 50 radish seeds and 50 wheat seeds are each placed in separate 1-ounce bottles together with 25 cc. of a 0.1% water suspension containing oxalimidic acid 2,2-dimethyldihydrazide to each bottle. The bottle containing seed and the test compound is clamped in place on a tumbler where it is rotated for 20 hours. The contents are then dumped into a Buchner funnel and are washed with approximately 250 cc. of water to remove excess and unfixed test compound. The washed seeds are placed on moist blotters and held in a high humidity cabinet for a five-day germination period. At the end of this time, 100% seed mortality is recorded.

We claim:
1. Unsymmetrically substituted oxalimidic acid 2,2-dimethyldihydrazide represented by the general formula:

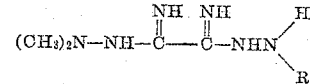

wherein R is a radical selected from the group consisting of a hydrogen atom, lower alkyl of from 1 to 4 carbon atoms and phenyl radicals.

2. The compound: oxalimidic acid 2,2-dimethyldihydrazide.

3. The compound: oxalimidic acid 2,2-dimethyl-2'-methyldihydrazide.

4. A process for the preparation of unsymmetrically substituted oxalimidic acid 2,2-dimethyl-dihydrazide represented by the general formula:

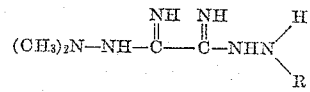

wherein R is a radical selected from the group consisting of a hydrogen atom, lower alkyl of from 1 to 4 carbon atoms and phenol radicals, which comprises: reacting approximately equimolar quantities of 1-cyanoformimidic acid 2,2-dimethylhydrazide with a compound selected from the group consisting of hydrazine, lower monoalkyl-substituted hydrazine and phenyl hydrazine in an acidified lower alkanol medium, and thereafter recovering the unsymmetrical oxalimidic acid 2,2-dimethyldihydrazide so formed.

5. The process according to claim 4 in which the compound reactant is hydrazine.

6. The process according to claim 4 in which the compound reactant is methylhydrazine.

7. The process according to claim 4 in which the compound reactant is phenylhydrazine.

8. The compound: oxalimidic acid 2,2-dimethyl-2'-phenyl dihydrazide.

References Cited in the file of this patent

Curtius et al.: J. Prak. Chem., 2nd Ser., vol. 50, pages 253–254 (1894).

Stolte et al.: J. Prakt. Chem., 2nd Ser., vol. 88, pages 306–314 (1913).

Dedichen: C. A., vol. 31, pages 4985–4986 (1937).

Zehrung et al.: J. Org. Chem., vol. 24, pages 1333–1336 (1959).